US012766057B2

(12) United States Patent

Furman et al.

(10) Patent No.: US 12,766,057 B2

(45) Date of Patent: *Oct. 20, 2026

(54) PATIENT SUPPORT APPARATUSES WITH DYNAMIC CONTROL PANELS

(71) Applicant: Stryker Corporation, Kalamazoo, MI (US)

(72) Inventors: Aaron Douglas Furman, Kalamazoo, MI (US); Cory Patrick Herbst, Shelbyville, MI (US); Anish Paul, Portage, MI (US)

(73) Assignee: Stryker Corporation, Portage, MI (US)

( * ) Notice: Subject to any disclaimer, the term of this patent is extended or adjusted under 35 U.S.C. 154(b) by 1171 days.

This patent is subject to a terminal disclaimer.

(21) Appl. No.: 17/834,342

(22) Filed: Jun. 7, 2022

(65) Prior Publication Data

US 2022/0296444 A1 Sep. 22, 2022

Related U.S. Application Data

(63) Continuation of application No. 16/568,629, filed on Sep. 12, 2019, now Pat. No. 11,351,074, which is a (Continued)

(51) Int. Cl.

*A61G 7/018* (2006.01)
*A61G 1/02* (2006.01)

(Continued)

(52) U.S. Cl.

CPC ............... *A61G 7/018* (2013.01); *A61G 1/04* (2013.01); *A61G 5/006* (2013.01); *A61G 5/1005* (2013.01);

(Continued)

(58) Field of Classification Search

CPC ........ A61G 7/002; A61G 7/005; A61G 7/012; A61G 7/015; A61G 7/018; A61G 13/02;

(Continued)

(56) References Cited

U.S. PATENT DOCUMENTS 5,542,138 A * 8/1996 Williams ............... F16M 11/14 5/503.1
7,779,494 B2 * 8/2010 Poulos ..................... A61G 7/16 5/618

(Continued)

FOREIGN PATENT DOCUMENTS

DE 2719534 A1 10/1978
DE 69932157 T2 11/2006

(Continued)

OTHER PUBLICATIONS

German Office Action for Application No. PCT/US2016/035616, dated Sep. 19, 2024, 8 pages.

*Primary Examiner* — Robert G Santos

(74) *Attorney, Agent, or Firm* — Gardner, Linn, Burkhart & Ondersma, LLP

(57) ABSTRACT

A patient support apparatus, such as a bed, cot, recliner, operating table, stretcher, or the like, includes a control panel with multiple controls for controlling functions of the patient support apparatus. A control system disables at least a first control and changes an illumination state of a backlight when the patient support apparatus is in a particular state. In some embodiments, the particular state is the arming of an exit detection system and/or the deactivation of a brake on the patient support apparatus. The particular state may also or alternatively be tied to a particular mode of the patient support apparatus, such as a diagnostic mode, a maintenance mode, and/or a normal mode. The control system may also never illuminate a first icon on the patient support apparatus if it was initially configured in a particular manner, such as being intended for sale in a particular geographic market.

14 Claims, 6 Drawing Sheets

Related U.S. Application Data continuation of application No. 15/170,979, filed on Jun. 2, 2016, now Pat. No. 10,420,688.

(60) Provisional application No. 62/171,472, filed on Jun. 5, 2015.

(51) Int. Cl.

| | |
|---|---|
| ***A61G 1/04*** | (2006.01) |
| ***A61G 5/00*** | (2006.01) |
| ***A61G 5/10*** | (2006.01) |
| ***A61G 7/005*** | (2006.01) |
| ***A61G 7/015*** | (2006.01) |
| ***A61G 7/05*** | (2006.01) |
| ***A61G 13/02*** | (2006.01) |
| ***A61G 13/04*** | (2006.01) |
| ***A61G 13/08*** | (2006.01) |

(52) U.S. Cl.

CPC ........... *A61G 5/1067* (2013.01); *A61G 13/02* (2013.01); *A61G 1/0287* (2013.01); *A61G 7/005* (2013.01); *A61G 7/015* (2013.01); *A61G 7/0528* (2016.11); *A61G 13/04* (2013.01); *A61G 13/08* (2013.01); *A61G 2203/10* (2013.01)

(58) Field of Classification Search

CPC ........ A61G 13/04; A61G 13/06; A61G 13/08; A61G 7/0528; A61G 1/027; A61G 1/04; A61G 5/006; A61G 5/1005; A61G 5/1056; A61G 5/1067; A61G 2203/10

USPC ..................... 5/600, 610, 611, 613, 616–618

See application file for complete search history.

(56) References Cited

U.S. PATENT DOCUMENTS

| | | | | |
|---|---|---|---|---|
| 7,882,582 | B2 * | 2/2011 | Kappeler | A61G 7/08 5/510 |
| 8,413,271 | B2 * | 4/2013 | Blanchard | A61G 7/001 5/173 |
| 9,038,217 | B2 * | 5/2015 | Elliot | G16Z 99/00 5/617 |
| 9,351,890 | B2 * | 5/2016 | Hough | A61G 5/1005 |
| 10,130,536 | B2 | 11/2018 | Roussy et al. | |
| 10,420,688 | B2 * | 9/2019 | Furman | A61G 7/018 |
| 11,351,074 | B2 * | 6/2022 | Furman | A61G 5/1005 |
| 11,571,071 | B2 * | 2/2023 | Hosokawa | A47C 31/008 |
| 2006/0053555 | A1 * | 3/2006 | Poulos | A61G 7/0514 5/618 |
| 2006/0101581 | A1 | 5/2006 | Blanchard et al. | |
| 2008/0086815 | A1 | 4/2008 | Kappeler et al. | |
| 2008/0172789 | A1 | 7/2008 | Elliot et al. | |
| 2009/0140891 | A1 | 6/2009 | Ragusa et al. | |
| 2014/0291950 | A1 | 10/2014 | Hough et al. | |
| 2016/0354263 | A1 * | 12/2016 | Furman | A61G 13/02 |
| 2019/0374039 | A1 * | 12/2019 | Hosokawa | A61G 13/02 |
| 2020/0046587 | A1 * | 2/2020 | Furman | A61G 13/02 |
| 2022/0296444 | A1 * | 9/2022 | Furman | A61G 5/1005 |

FOREIGN PATENT DOCUMENTS

| | | | |
|---|---|---|---|
| DE | 202008006070 | U1 | 9/2009 |
| DE | 202008018080 | U1 | 8/2011 |
| JP | 10127720 | A | 5/1998 |
| WO | 2016/196864 | A1 | 12/2016 |

* cited by examiner

PATIENT SUPPORT APPARATUSES WITH DYNAMIC CONTROL PANELS

CROSS-REFERENCE TO RELATED APPLICATIONS

This application claims priority to U.S. patent application Ser. No. 16/568,629 filed Sep. 12, 2019, by inventors Aaron Furman et al. and entitled PATIENT SUPPORT APPARATUSES WITH DYNAMIC CONTROL PANELS, now U.S. Pat. No. 11,351,074, which in turn claims priority to U.S. patent application Ser. No. 15/170,979 filed Jun. 2, 2016, by inventors Aaron Furman et al. and entitled PATIENT SUPPORT APPARATUSES WITH DYNAMIC CONTROL PANELS, now U.S. Pat. No. 10,420,688, which in turn claims priority to U.S. provisional patent application Ser. No. 62/171,472 filed Jun. 5, 2015, by inventors Aaron Furman et al. and entitled PATIENT SUPPORT APPARATUSES WITH DYNAMIC CONTROL PANELS, the complete disclosures of all of which are incorporated herein by reference.

BACKGROUND

The present disclosure relates to patient care devices, such as patient thermal temperature management systems, as well as patient support apparatuses, such as beds, cots, stretchers, recliners, and the like.

Patient care devices often include one or more control panels for controlling aspects of the patient care device. Such control panels may be touch screens, may include a plurality of discrete buttons or switches, or may include combinations of these and other types of controls. Regardless of the specific physical construction of the control panel, it is often desirable for the control panel to be easily understood so that a user can quickly understand how the control panel operates.

SUMMARY

According to some embodiments, the present disclosure relates to patient care devices having control panels that are more easily understood by users and/or that automatically adapt to changing conditions. The automatic adaptations help ensure that the user understands how the functionality of the patient care device changes in response to changing states or conditions of the patient care devices.

According to one embodiment, a patient support apparatus is provided that includes a frame, wheels, a support surface for supporting a patient, an actuator assembly, a control panel, first and second backlights, and a control system. The actuator assembly is for moving the support surface to a plurality of different configurations. The control panel includes a first control for moving the support surface in a first manner and a second control for moving the support surface in a second manner. The first backlight provides backlighting for the first control and the second backlight provides backlighting for the second control. The control system disables the first control when the support surface is in a particular configuration and changes an illumination state of the first backlight when the support surface is in the particular configuration.

In other embodiments, the control system also enables the second control and does not change an illumination state of the second backlight when the support surface is in the particular configuration. The control system may further include a third control on the control panel for moving the support surface in a third manner, and a third backlight for backlight the third control. When so included, the control system enables the third control and does not change an illumination state of the third backlight when the support surface is in the particular configuration.

In some embodiments, the patient support apparatus includes a battery for powering the actuator assembly and the control system disables the first control but enables the second control when a charge level of the battery falls below a threshold.

Still further, in some embodiments the patient support apparatus is a recliner having a seat, a backrest, and a leg rest. When implemented as a recliner, the first control raises a height of the seat and the second control lowers a height of the seat, at least in some embodiments. The particular configuration may refer to any one of the following: a flat configuration in which the seat, backrest, and leg rest are substantially horizontal; a Trendelenburg configuration in which the leg rest supports the patient's legs at a higher height than the backrest supports the patient's head; a stand-assist configuration in which the backrest, seat, and leg rest are collectively oriented to support the patient while the patient is nearly standing; or a maximum height configuration in which the seat is raised to its maximum height.

In some embodiments, the first control lowers the height of the seat and the particular configuration is a minimum height configuration in which the seat is lowered to its minimum height.

In other embodiments, the first control moves the support surface to a Trendelenburg configuration in which the patient's head is supported at a height lower than the patient's legs, and the particular configuration is the Trendelenburg configuration.

In still other embodiments, the first control moves the support surface to a stand-assist configuration in which the support surface is oriented to support the patient while the patient is nearly standing, and the particular configuration is the stand-assist configuration.

In another embodiment, a patient support apparatus is provided that includes a frame, wheels, a support surface, an actuator assembly, a control panel, first and second backlights, and a control system. The actuator assembly moves the support surface to a plurality of different configurations. The control panel includes a first control for controlling a first function of the patient support apparatus and a second control for controlling a second function of the patient support apparatus. The first backlight provides backlighting for the first control and the second backlight provides backlighting for the second control. The control system disables the first control when the patient support apparatus is in a particular state and changes an illumination state of the first backlight when the patient support apparatus is in the particular state.

An exit detection system is included in some embodiments and the particular state is defined by the exit detection system being armed. When so armed, the first function that is disabled is movement of the support surface to one of a Trendelenburg configuration, a stand-assist configuration, and a flat configuration.

In some embodiments, the particular state is defined by the support surface being in one of a Trendelenburg configuration, a stand-assist configuration, and a flat configuration, and the first function arms the exit detection system.

When a battery is included for powering the actuator assembly, the particular state is defined by a charge level of the battery falling below a threshold, in some embodiments. The control system enables the second control when the patient support apparatus is in the particular state and does not change an illumination state of the second backlight when the patient support apparatus is in the particular state. The first function raises a height of the support surface and the second function lowers the height of the support surface.

In another embodiment, the particular state is defined by a brake being in an unbraked state, and the first function moves the support surface to a stand-assist configuration in which the support surface is oriented to support the patient while the patient is nearly standing.

According to another embodiment, a patient support apparatus is provided that includes a frame, wheels, a support surface, an actuator assembly, an exit detection system, a control panel, first and second backlights, and a control system. The actuator assembly moves the support surface to a plurality of different configurations. The exit detection system, when armed, detects when the patient has exited the support surface. The control panel includes a first control for controlling a first function of the patient support apparatus and a second control for arming the exit detection system. The first backlight provides backlighting for the first control and the second backlight provides backlighting for the second control. The control system disables the first control when the exit detection system is armed and changes an illumination state of the first backlight when the exit detection system is armed.

The first control, in some embodiments, moves the support surface to one of a Trendelenburg configuration, a stand-assist configuration, and a flat configuration. In other embodiments, the first control moves the support surface to a stand-assist configuration in which the support surface is oriented to support the patient while the patient is nearly standing. When the first control moves the support surface to a stand-assign configuration, the control system may further be adapted to also disable the first control when the brake is in the unbraked state and to change the illumination state of the first backlight when brake is in the unbraked state.

According to another embodiment, a patient support apparatus is provided that includes a frame, wheels, a support surface, an actuator assembly, a brake, a control panel, first and second backlights, and a control system. The actuator assembly moves the support surface to a plurality of different configurations. The brake is changeable between a braked state and an unbraked state. The control panel includes a first control for controlling a first function of the patient support apparatus and a second control for controlling a second function of the patient support apparatus. The first backlight provides backlighting for the first control and the second backlight provides backlighting for the second control. The control system disables the first control when the brake is in the unbraked state and changes an illumination state of the first backlight when the brake is in the unbraked state.

In some embodiments, the control system enables the second control and does not change an illumination state of the second backlight when the brake is in the unbraked state.

According to another embodiment, a patient support apparatus is provided that includes a frame, wheels, a support surface, an actuator assembly, a control panel, and a control system. The actuator assembly moves the support surface to a plurality of different configurations and includes a plurality of actuators. The control panel includes a first icon and a second icon. The control system switches the patient support apparatus from a first mode to a second mode. When the patient support apparatus is in the first mode, the first icon is associated with a first function of the patient support apparatus and the second icon is associated with a second function of the patient support apparatus. When the patient support apparatus is in the second mode, the first icon is associated with a third function of the patient support apparatus and the second icon is associated with a fourth function of the patient support apparatus.

In some embodiments, the first function activates the plurality of actuators to move the support surface to a first configuration and the second function activates the plurality of actuators to move the support surface to a second configuration. In some of such embodiments, the third function activates a first individual one of the plurality of actuators only, and the fourth function activates a second individual one of the plurality of actuators only.

In other embodiments, the first function indicates one of the different configurations of the support surface and the third function indicates diagnostic information regarding the patient support apparatus.

In another embodiment, the first function indicates one of the different configurations of the support surface and the third function indicates a code. The first icon may include a plurality of markers that are selectively illuminated to indicate the configuration of the support surface and that are selectively illuminated to indicate the code.

The control panel further includes a third icon and a backlight for backlighting the third icon, in some embodiments. When included, the control system activates the backlight when the patient support apparatus is in the first mode and deactivates the backlight when the patient support apparatus is in the second mode.

According to another embodiment, a patient support apparatus is provided that includes a frame, wheels, a support surface, an actuator assembly, a control panel, first and second backlights, and a control system. The control panel includes first and second icons that are backlit by the first and second backlights, respectively. The control system lights the first backlight during normal operation of the patient support apparatus if the patient support apparatus was manufactured or configured in a first state and only selectively lights the second backlight if the patient support apparatus was manufactured of configured in the first state.

In other embodiments, the first icon indicates a charge status of a battery and the first state corresponds to the patient support apparatus being manufactured or configured without a battery.

The control system, in some embodiments, selectively lights the first backlight and never lights the second backlight if the patient support apparatus was manufactured or configured in a second state. In some such embodiments, the first icon includes an English word or caption and the first state corresponds to the patient support apparatus being manufactured of configured for sale in a non-English speaking country (or locale), and the second icon includes no words and the second state corresponds to the patient support apparatus being manufactured or configured for sale in an English-speaking country (or locale).

The first icon and the second icon each control, when pressed, the same function of the patient support apparatus, in at least some embodiments.

The first icon, when pressed, controls the actuator assembly when the patient support apparatus is manufactured or configured in the second state, and second icon, when pressed, controls the actuator assembly when the patient support apparatus is manufactured or configured in the first state.

Before the various embodiments disclosed herein are explained in detail, it is to be understood that the claims are not to be limited to the details of operation, to the details of construction, or to the arrangement of the components set forth in the following description or illustrated in the drawings. The embodiments described herein are capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the claims to any specific order or number of components. Nor should the use of enumeration be construed as excluding from the scope of the claims any additional steps or components that might be combined with or into the enumerated steps or components.

DETAILED DESCRIPTION OF THE EMBODIMENTS

Figure 1:
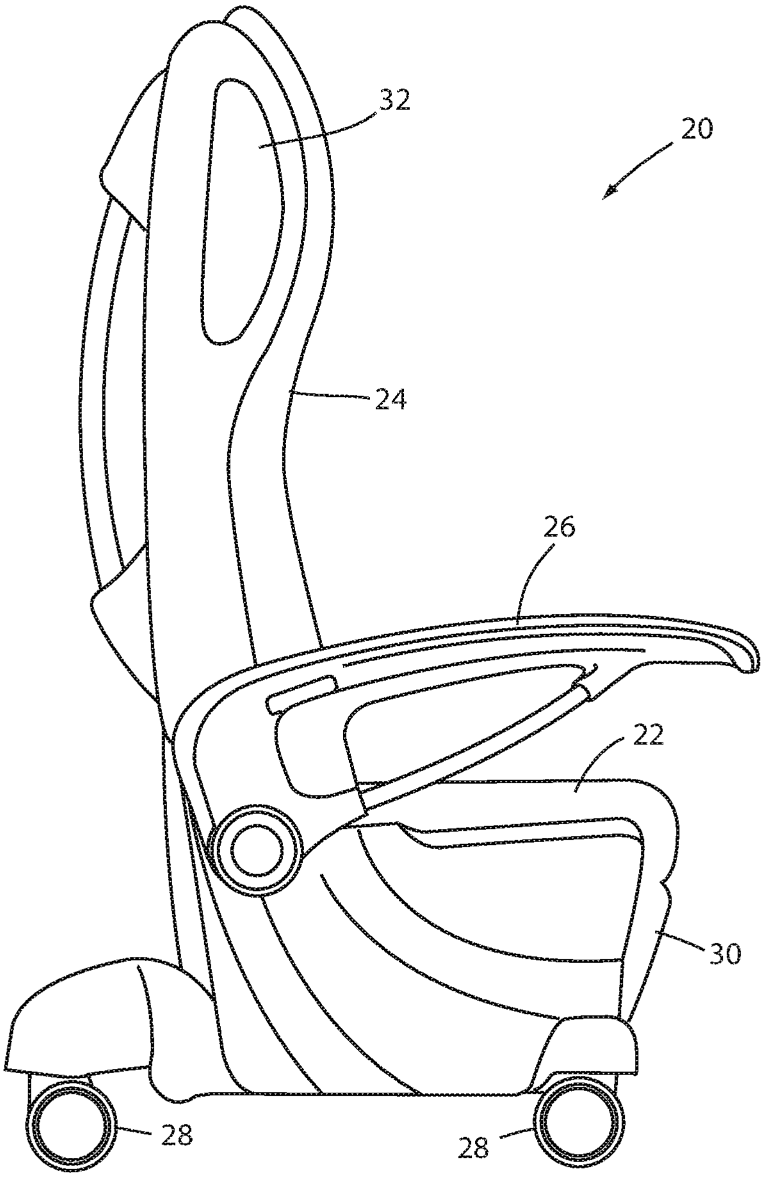
FIG. 1 is a side elevation view of a patient support apparatus embodying various aspects of the present disclosure.

A patient support apparatus 20 according to one embodiment of the present disclosure is shown in FIG. 1. Patient support apparatus 20, as shown in FIG. 1, is implemented as a recliner. It will be understood, however, that patient support apparatus 20 can be alternatively implemented as a bed, a cot, a stretcher, or still other types of apparatuses that are capable of supporting a patient. Further, it will be understood that the embodiments of the present disclosure discussed herein can alternatively be incorporated into other types of patient care devices, such as, but not limited to, temperature management systems for controlling the temperature of patients. One such temperature management system is disclosed in commonly assigned U.S. patent application Ser. No. 14/282,383 filed May 20, 2014 by inventors Christopher J. Hopper et al. and entitled THERMAL CONTROL SYSTEM, the complete disclosure of which is hereby incorporated herein by reference.

Person support apparatus 20 of FIG. 1 includes a support surface or seat 22, a backrest 24, an armrest 26, a plurality of wheels 28, an adjustable leg rest 30, and two control panels 32 (one positioned on either side of patient support apparatus 20, with only one visible in FIG. 1). Backrest 24 is angularly adjustable with respect to seat 22 about a pivot axis that extends perpendicularly out of the plane of the page of FIG. 1 so that a patient seated on seat 22 can change how far he or she leans back on patient support apparatus 20. Leg rest 30 is also movable from a stowed position (shown in FIG. 1) to an extended position that supports a patient's legs in a substantially horizontal orientation. The movement and physical construction of patient support apparatus 20 of FIG. 1 may take on any of the forms disclosed in commonly assigned U.S. patent application Ser. No. 14/212,253 filed Mar. 14, 2014 by inventors Christopher Hough et al. and entitled MEDICAL SUPPORT APPARATUS, the complete disclosure of which is incorporated herein by reference.

The control of the movement of patient support apparatus 20 is carried out via the control panels 32. Control panels 32 include a plurality of controls 34 that, when pressed, implement one or more functions associated with patient support apparatus 20. More specifically, such controls 34 include controls for moving seat 22, backrest 24, and/or leg rest 30; a control for activating and deactivating an exit detection system; a control for activating and deactivating a patient lockout function; and controls for changing the states of control panel 32, as will be discussed in greater detail below. In at least one embodiment, control panels 32 are implemented as touch screens, while in other embodiments control panels 32 are implemented without the use of a touch screen. In some of the embodiments of control panel 32 that are implemented to include a touch screen, the touch screen in constructed in any of the manners disclosed in commonly assigned, U.S. patent application Ser. No. 62/166,354, filed May 26, 2015, by inventors Daniel Brosnan et al. and entitled USER INTERFACES FOR PATIENT CARE DEVICES, the complete disclosure of which is incorporated herein by reference.

Figure 2:
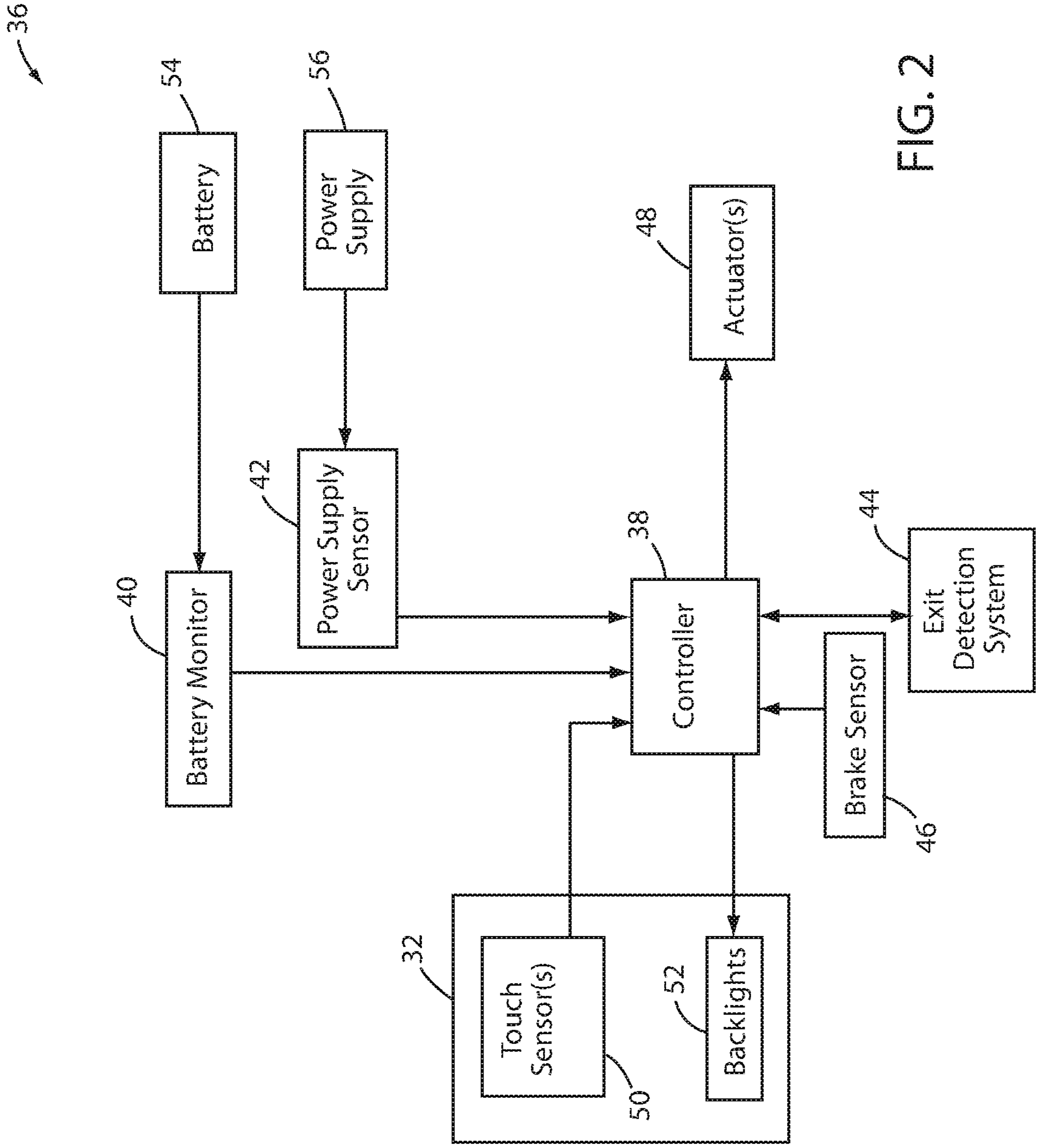
FIG. 2 is a diagram of a control system usable on any of the patient support apparatuses described herein, including that of FIG. 1.

FIG. 2 illustrates a control system 36 that is usable with the patient support apparatus 20, whatever its particular physical implementation. Control system 36 includes, in addition to one or more control panels 32, a controller 38, a battery monitor 40, a power supply sensor 42, an exit detection system 44, a brake sensor 46, and one or more actuators 48 (which may be motors or other types of actuators). Control panel 32 includes a plurality of touch sensors 50 that sense when a user touches control panel 32, as well as the specific control 34 (FIG. 3) that is touched by the user. A plurality of backlights 52 are also included within control panel 32. Backlights 52 are selectively activated and deactivated by controller 38 in order to selectively illuminate one or more of the controls 34 and/or indicators on control panel 32.

In the embodiment shown in FIG. 2, patient support apparatus 20 is powered by two alternative power sources, a battery 54 and a mains power supply 56. Mains power supply 56 refers to an electrical connection to a source of electrical current (typically alternating current, but could also be direct current), such as, but not limited to, a power cable having one end coupled to patient support apparatus 20 and the other end plugged into a conventional electrical power outlet. In other embodiments of patient support apparatus 20, no battery option is provided, as will be discussed in more detail below.

Controller 38 is constructed of any electrical component, or group of electrical components, that are capable of carrying out the functions described herein. In many embodiments, controller 38 is a conventional microcontroller, although not all such embodiments need include a microcontroller. In general, controller 38 includes any one or more microprocessors, microcontrollers, field programmable gate arrays, systems on a chip, volatile or nonvolatile memory, discrete circuitry, and/or other hardware, software, or firmware that is capable of carrying out the functions described herein, as would be known to one of ordinary skill in the art. Such components can be physically configured in any suitable manner, such as by mounting them to one or more circuit boards, or arranging them in other manners, whether combined into a single unit or distributed across multiple units. The instructions followed by controller 38 in carrying out the functions described herein, as well as the data necessary for carrying out these functions, are stored in a memory (not labeled) accessible to controller 38.

Battery monitor 40 monitors the charge state of battery 54 and reports this charge state to controller 38. Power supply sensor 42 determines whether or not power supply 56 is present. In other words, power supply sensor 42 determines whether or not patient support apparatus 20 has its power cable coupled to an electrical outlet, or whether patient support apparatus 20 is operating on battery power. Power supply sensor 42 sends a signal to controller 38 indicating that power supply 56 is present, or alternatively sends a signal to controller 38 when patient support apparatus 20 is operating on battery power. Collectively, battery monitor 40 and power supply sensor 42 inform controller 38 whether or not patient support apparatus 20 is currently operating on battery power or electrical outlet power, as well as what the charge status of battery 54 currently is.

Controller 38 is also in communication with actuators 48, exit detection system 44, and brake sensor 46. Controller 38 oversees the operation of the one or more actuators 48, either directly or indirectly through the control of one or more actuator drivers. In the embodiment of FIG. 1, actuators 48 include a plurality of individual motors for moving seat 22, backrest 24, and leg rest 30. Controller 38 receives a signal from brake sensor 46 indicating whether a brake for wheels 28 has been activated. Controller 38 communicates with exit detection system 44 to both arm and disarm exit detection system 44 based upon user instructions received via control panel 32. Controller 38 also receives data from exit detection system 44 when an occupant of patient support apparatus 20 attempts to leave, or does leave, patient support apparatus 20 while exit detection system 44 is armed.

Exit detection system 44 issues an alert (audio and/or visual; and local and/or remote) when it detects that an occupant of patient support apparatus 20 may be about to, or already has, exited from patient support apparatus 20. In some embodiments, exit detection system 44 may take on any of the forms, and include any of the features, of the exit detection systems described in commonly assigned U.S. Pat. No. 5,276,432 issued to Travis and entitled PATIENT EXIT DETECTION MECHANISM FOR HOSPITAL BED; or commonly assigned U.S. patent application Ser. No. 14/212,367 filed Mar. 14, 2014 by inventors Michael Joseph Hayes et al. and entitled PATIENT SUPPORT APPARATUS WITH PATIENT INFORMATION SENSORS; or commonly assigned U.S. patent application Ser. No. 62/065,242 filed Oct. 17, 2014 by inventors Marko N. Kostic et al. and entitled PERSON SUPPORT APPARATUS WITH MOTION MONITORING; or commonly assigned U.S. patent application Ser. No. 61/989,243 filed May 6, 2014 by inventors Marko N. Kostic et al. and entitled PERSON SUPPORT APPARATUS WITH POSITION MONITORING; or commonly assigned U.S. patent application Ser. No. 62/076,005 filed Nov. 6, 2014 by inventors Marko N. Kostic et al. and entitled EXIT DETECTION SYSTEM WITH COMPENSATION, the complete disclosure of all of which are incorporated herein by reference.

Controller 38 is also in communication with touch sensors 50 and backlights 52 of control panel 32. Control panel 32 includes a touch sensor 50 for each control 34 on control panel 32, as will be discussed in greater detail below. Controller 38 also dynamically controls the activation and deactivation of backlights 52 based upon a power state and configuration state of patient support apparatus 20. The manner in which controller 38 carries out this dynamic control, in at least one embodiment, is summarized in Table 1 below.

As set forth therein, controller 38 provides a user of patient support apparatus 20 with three different levels of functionality: full functionality, limited functionality, and no functionality. The conditions for determining which of these three levels of functionality to provide the user is determined based on the criteria set forth in Tables 1 and 2. More specifically, controller 38 examines two different states of patient support apparatus 20: a power state and a configuration state. With respect to the power state, controller 38 determines—via information received from battery monitor 40 and power supply sensor 42—whether patient support apparatus is plugged in (e.g. power supply 56 is present) or not. If power supply 56 is present, controller 38 provides full functionality to the user (unless one or more of the functionality limiting conditions of the configuration state are present, as discussed below).

If power supply 56 is not present (i.e. patient support apparatus 20 is operating on battery power), controller 38 determines where the current charge state of battery 54 falls with respect to first and second thresholds. The first threshold is higher than the second threshold. If battery 54 is currently charged above the first threshold, controller 38 provides full functionality to the user (again subject to limitations that may be imposed due to the configuration state of patient support apparatus 20). If the charge of battery 54 is less than the first threshold but greater than the second threshold, then controller 38 provides a limited level of functionality to the user. Finally, if the charge status of battery 54 is lower than the second threshold, then patient support apparatus 20 shuts down, and no level of functionality is provided.

TABLE 1

Power State Limited Functionality

| Patient Support Apparatus Functionality | Power State: Power Supply 56 Present | Power State: Battery Charge Above 1$^{st}$ Threshold | Power State: Battery Charge Between 1$^{st}$ and 2$^{nd}$ Thresholds | Power State: Battery Charge Below 2$^{nd}$ Threshold |
|---|---|---|---|---|
| Full | X | X | | |
| Limited | | | X | |
| None | | | | X |

Controller 38 also considers the configuration state of patient support apparatus 20 when determining which level of functionality to provide the user, as is summarized in Table 2 below. As shown therein, controller 38 limits the functionality of patient support apparatus 20 if the brake is off, but does not limit the functionality of patient support apparatus 20 if the brake is on. Controller 38 also limits the functionality of patient support apparatus 20 if the exit detection system is armed, but does not limit the functionality when the exit detection system is disarmed. Finally, controller 38 limits the functionality of patient support apparatus 20 if the limits of one or more of the actuators 48 have been reached, but does not limit the functionality of patient support apparatus 20 when none of the actuator limits have been reached.

From Tables 1 and 2 it can therefore be seen that controller 38 limits the functionality of patient support apparatus 20 based upon four different conditions: (1) the battery charge level, (2) the state of the brake, (3) the state of exit detection system 44, and (4) the state of actuators 48. In carrying out the limiting of the functionality of patient support apparatus 20, it is only necessary for one of these conditions to be present in order to cause controller 38 to limit the functionality of patient support apparatus 20. That is, controller 38 will limit the functionality of patient support apparatus 20 if the battery charge is between the two thresholds or if the brake is off or if the exit detection system is armed or if an actuator limit has been reached.

TABLE 2

Configuration State Limited Functionality

| Patient Support Apparatus Functionality | Configuration State | | | | | |
|---|---|---|---|---|---|---|
| | Brake Off | Brake On | Exit Detection System Armed | Exit Detection System Disarmed | Actuator Limit Reached | Actuator Limit Not Reached |
| Full | | X | | X | | X |
| Limited | X | | X | | X | |
| None | | | | | | |

Further, the fact that one, two, or three of these functionality-limiting conditions is absent does not prevent controller 38 from limiting the functionality of patient support apparatus 20 if one or more of the other functionality-limiting conditions are present. In other words, if, for example, the brake is on and the battery charge level is above the first threshold, controller 38 will still limit the functionality of patient support apparatus 20 if the exit detection system is armed or if an actuator limit has been reached. As another example, if the exit detection system is not armed, but the brake is off or the battery has a charge level between the two thresholds, controller 38 will also limit the functionality of patient support apparatus 20.

The manner in which patient support apparatus 20 limits the functionality of patient support apparatus will vary, in at least one embodiment, based upon the specific condition or conditions that are causing the functionality limitation. Thus, for example, controller 38 may eliminate a first function of patient support apparatus 20 when the brake is off and eliminate a second and different function of patient support apparatus 20 when the exit detection system is armed. Still other functions of patient support apparatus 20 may be eliminated if the battery charge level has fallen below the first threshold (but above the second threshold) and/or if an actuator limit has been reached.

When controller 38 limits the functionality of patient support apparatus 20 in one or more manners, controller 38 also dynamically changes the functionality and appearance of the one or more control panels 32 so that they match the reduced functionality of patient support apparatus 20. Similarly, when the one or more functionality-limiting conditions cease and controller 38 restores the functionality of patient support apparatus 20, controller 38 also dynamically changes the functionality and appearance of the control panel 32 so that it matches the restored functionality. In this manner, the controls 34 on control panel 32 are dynamically activated and deactivated based upon the power state and configuration state of patient support apparatus.

Control panel 32 of FIG. 2 is constructed, in one embodiment, in the same manner—with one exception—as the control panel described in commonly assigned, copending application Ser. No. 14/282,383 filed May 20, 2014 by applicants Christopher Hopper et al. and entitled THERMAL CONTROL SYSTEM, the complete disclosure of which is incorporated herein by reference. The one exception is that the control panel 32 of FIG. 2 does not include an LCD display, such as is found in the control panel of the '383 application. However, in other embodiments of the control panel 32 of FIG. 2, control panel 32 can be modified to include an LCD display, or other type of graphic display.

Figure 3A:
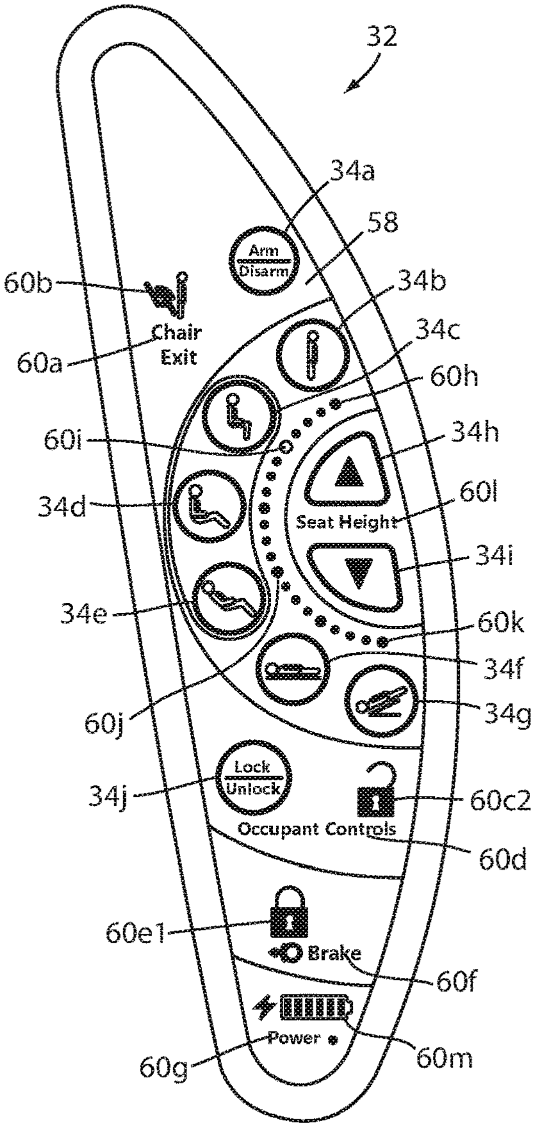
FIG. 3A is a plan view of a control panel usable on the patient support apparatus of FIG. 1 shown in a state where an exit detection system has not been armed.

As can be seen in FIG. 3A, control panel 32 not only includes a plurality of controls 34 for controlling various functions of patient support apparatus 20, but it also includes a plurality of indicators 60 that provide information to the user of patient support apparatus 20. Some of the indicators 60 are in the form of English words, such as indicator 60*a*, which states the phrase "chair exit." Other of the indicators 60 include icons, such as indicator 60*b*, which is positioned above indicator 60*a* and provides an icon of a patient exiting from the chair and an alert being issued as a result of the occupant's departure from the chair. Indicators 60, unlike the controls 34, do not cause any action to be performed by patient support apparatus 20 when they are pressed. Instead, they merely provide information to the user of patient support apparatus 20 when they are illuminated. Controls 34, in contrast, are associated with one or more functions of patient support apparatus 20 and carry out a function when pressed (provided their associated backlight is illuminated and their functionality has not been temporarily eliminated, as discussed more below).

Regardless of the precise layout of controls 34 and indicators 60, control panel 32 is physically constructed such that it includes a generally black background 58 (FIG. 3A). Black background 58 is sufficiently opaque such that the light emitted from the backlights 52, which are positioned behind background 58, does not penetrate black background 58. Black background 58, however, includes a plurality of cutouts or other structures that allow light from the backlights 52 to pass therethrough that are positioned at the locations of controls 34 and indicators 60. The cutouts, or other light transparent structures, are shaped to define icons, words, and/or other indicators, and become visible when the associated backlight 52 is activated. When the associated backlight 52 is deactivated by controller 38, the lack of back illumination causes the area of the control 34 or indicator 60 to appear black, thereby blending in with the adjacent black background 58 of the control panel and making the control 34 or indicator 60 virtually, if not completely, invisible. This selective disappearance of controls 34 or indicators 60 is sometimes referred to as "dead fronting." As will be discussed in greater detail below, controller 38 deactivates the associated backlighting of one or more of the controls 34 or indicators 60 when it reduces the functionality of patient support apparatus 20 based on either the power state or configuration state of patient support apparatus 20. Such controls and indicators therefore effectively disappear from control panel 32 when the functionality of patient support apparatus 20 is reduced, and reappear when the functionality is restored (via activating the corresponding backlights 52).

In at least one embodiment, the black background 58 is provided by applying a black ink to the back side of a layer of glass, plastic, or other translucent material. The ink is either not applied in those areas of the layer that corresponds to controls 34 and indicators 60, or is etched away after it is applied. IN other embodiments, different colored inks (or other substances) can be applied in selected areas and/or etched away in other areas. In still other embodiments, materials having different reflective properties may be used and arranged in appropriate manners to create the selectively illuminated indicia on control panel 32.

Various specific examples of controls 34 and indicators 60 that are visually and functionally eliminated from control panel 32, based on specific changes in the configuration and/or power state of patient support apparatus 20, will now be discussed with reference to FIGS. 3A-3H. It will be understood that the specific controls and indicators that are eliminated (and restored), as well as the corresponding configuration and/or power states that cause their elimination, can be varied from the discussion below.

As shown in FIG. 3A, control panel 32 includes controls 34*a-j*. Control 34*a*, when pressed, toggles between arming and disarming exit detection system 44. Controls 34*b-g* carry out coordinated movement of seat 22, backrest 24, and leg rest 30 to different configurations. For example, control 34*b* moves seat 22, backrest 24, and leg rest 30 to a stand assist position, and control 34*g* moves seat 22, backrest 24, and leg rest 30 to a Trendelenburg configuration. Further description of the movement that results from pressing controls 34*b*-34*g* is provided in commonly assigned U.S. patent application Ser. No. 62/029,142 filed Jul. 25, 2014 by inventors Anish Paul et al. and entitled MEDICAL SUPPORT APPARATUS, the complete disclosure of which is hereby incorporated herein by reference.

Figure 3B:
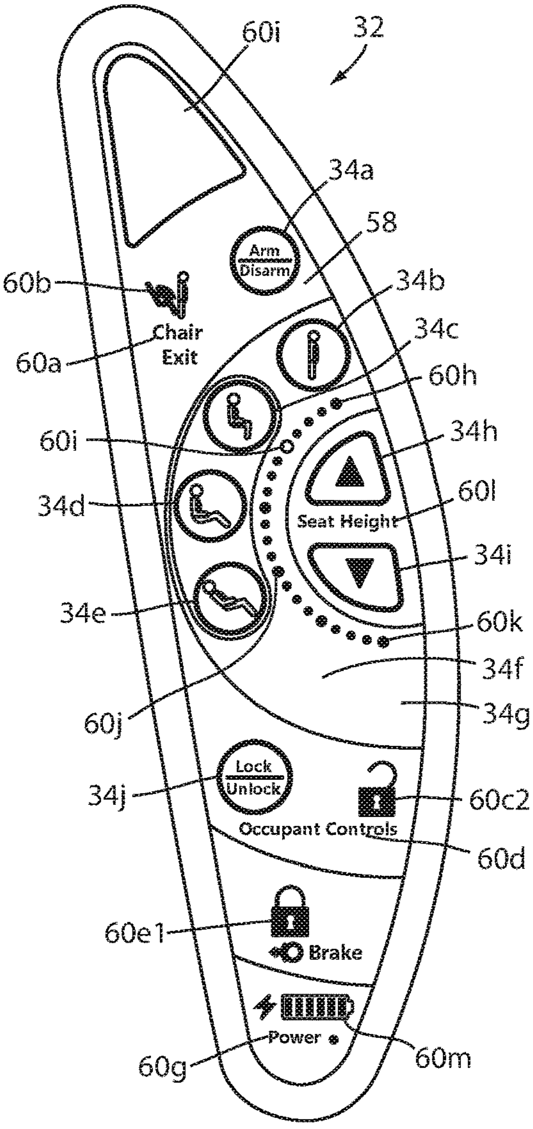
FIG. 3B is a plan view of the control panel of FIG. 3A shown in a state where an exit detection system of the patient support apparatus has been armed.
Figure 3C:
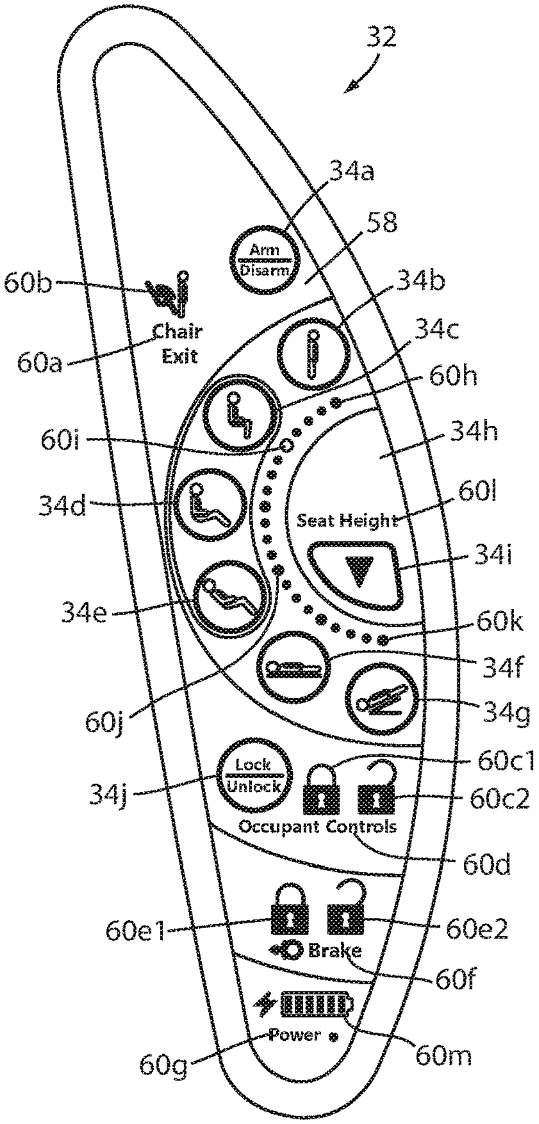
FIG. 3C is a plan view of the control panel of FIG. 3A shown in a state where an actuator limit has been reached.
Figure 3D:
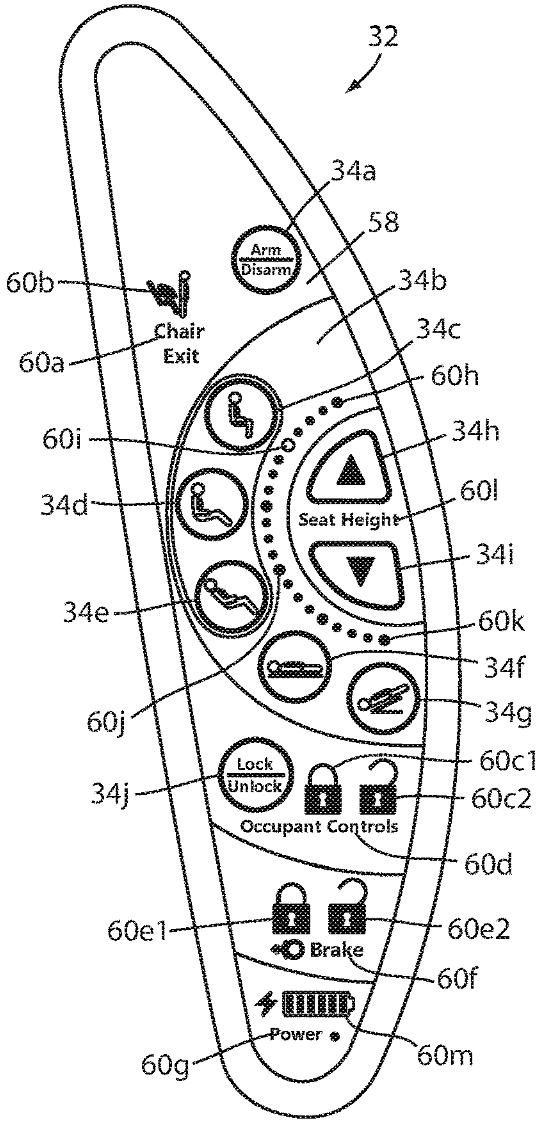
FIG. 3D is a plan view of the control panel of FIG. 3A shown in a state where a brake of the patient support apparatus has not been activated.

Control 34*j*, when pressed, toggles between locking and unlocking the patient control panels (not shown). In at least one embodiment, patient support apparatus 20 includes, in addition to two control panels 32 that are positioned on opposite sides of backrest 24 and that are primarily intended for use by a caregiver, another one or two control panels that are positioned on armrests 26 and that are primarily intended for use by the occupant of patient support apparatus 20. The patient control panels allows the patient to move the seat, backrest, and armrest to certain configurations, but do not allow the patient to perform other functions (such as arming and disarming the exit detection system). In some situations, it is desirable to lock out these patient control panels so that the patient cannot change the physical configuration of patient support apparatus 20. In order to do so, the caregiver presses on control 34*j* causing the patient control panels to be locked. When locked, controller 38 activates the backlight 52 positioned behind a lockout indicator 60*c*1 (FIG. 3C) that is shaped as a closed lock. When unlocked, controller 38 activates the backlight 52 positioned behind an adjacent lockout indicator 60*c*2 that is shaped as an open lock (FIGS. 3A-3D). These indicators 60*c*1 and 60*c*2 inform the user whether or not the patient control panels are locked out or not. Although FIGS. 3C and 3D illustrate both indicators 60*c*1 and 60*c*2 as simultaneously being backlit, it will be understood that this is purely for illustrative purposes and that in actual operation controller 38 only illuminates one or the other of indicators 60*c*1 and 60*c*2 at a time. An English word indicator 60*d* identifies indicators 60*c*1 and 60*c*2 as corresponding to the occupant control lockouts.

Control panel 32 further includes controls 34*h* and 34*i* that, when pressed, change the height of seat 22. Specifically, control 34*h* actuates one or more actuators 48 in a manner that raises the height of seat 22, and control 34*i* actuates the one or more actuators 48 in a manner that lowers the height of seat 22. An English language indicator 60*l* identifies the controls 34*h* and 34*i* as controls for controlling the height of seat 22.

Control panel 32 also includes a first brake indicator 60*e*1, a second brake indicator 60*e*2 (FIG. 3C), and a third brake indicator 60*f*. First brake indicator 60*e*1 is an icon of a closed lock and is illuminated by a corresponding backlight 52 when the brake on patient support apparatus 20 is activated. Second brake indicator 60*e*2, which is shown in FIG. 3C but not FIG. 3A, is positioned to the right of first brake indicator 60*e* and is an icon of an open lock. This open lock icon is backlit when the brake of patient support apparatus 20 is not activated (i.e. unlocked). Although FIGS. 3C and 3D illustrate both indicators 60*e*1 and 60*e*2 as simultaneously being backlit, it will be understood that this is purely for illustrative purposes and that in actual operation controller 38 only illuminates one or the other of indicators 60*e*1 and 60*e*2 at a time. Third brake indicator 60*f* is an English language indicator that identifies first brake indicator 60*e*1 and second brake indicator 60*e*2 as corresponding to the state of patient support apparatus 20's brake.

A plurality of indicators 60 are also provided on control panel 32 that are shaped as small circles and arranged in a curved line. Four of these indicators 60 are identified in FIG. 3A and labeled 60*h*, 60*i*, 60*j*, and 60*k*. During normal operation of control panel 32, these indicators provide an indication of the current configuration of seat 22, backrest 24, and leg rest 30 relative to the predefined configurations associated with controls 34*b-g*. More specifically, one of these indicators is illuminated more brightly than the other indicators (in the case of FIG. 3A, indicator 60*i* is illuminated more brightly than the other circles), and this brighter indicator identifies how the current configuration of seat 22, backrest 24, and leg rest 30 relates to the predefined configurations of controls 34*b-g*. Thus, in the example of FIG. 3A, indicator 60*i* is illuminated more brightly than the other circular indicators, thereby signifying that the seat 22, backrest 24, and leg rest 30 of patient support apparatus 20 are currently in the configuration associated with control 34*c* (which is the control 34 closest to indicator 60*i*). Further explanation of these circular indicators is provided in the aforementioned commonly assigned U.S. patent application 62/029,142, and need not be repeated herein.

A power indicator 60*g* is also provided on control panel 32 and provides an indication that patient support apparatus 20 is plugged into an electrical power outlet.

As was noted, when controller 38 determines that patient support apparatus 20 is in a power state and/or a configuration state that limits the functionality of patient support apparatus 20, controller 38 dynamically adjusts the appearance and functionality of control panel 32 to match this limited functionality. One example of this limited functionality can be seen with reference to FIG. 3B. FIG. 3B illustrates control panel 32 after a user has pressed on control 34*a* and activated exit detection system 44. As can be seen in FIG. 3B, certain of the functions of control panel 32 are no longer available after the activation of exit detection system 44. More specifically, controls 34*b*, 34*f*, and 34*g* are no longer visible or functional. Their visibility has been eliminated by shutting off their associated backlights 52. Their functionality has been eliminated by having controller 38 no longer respond in the normal manner to signals from touch sensors 50 that are positioned at the locations of controls 34*b*, 34*f*, and 34*g*. As a result, when a user activates exit detection system 44 of patient support apparatus 20, the user can no longer move seat 22, backrest 24, and leg rest 30 to the configurations defined by controls 34*b*, 34*f*, and 34*g*. The user, however, is still able to move seat 22, backrest 24, and leg rest 30 to the configurations defined by controls 34*c*, *d*, and *e* (as well as intermediate configurations between these configurations).

When a user disarms exit detection system 44, controller 38 dynamically adjusts the visual appearance and functionality of control panel 32 so that controls 34*b*, *f*, and *g* reappear and become functional once again. In other words, when the user disarms exit detection system 44, the look of control panel 32 changes from that of FIG. 3B back to that of FIG. 3A.

As can also be seen in FIG. 3B, when a user arms exit detection system 44, controller 38 illuminates the backlights 52 positioned behind a bed exit indicator 60*l*. Bed exit indicator 60*l* is significantly larger than the other indicators 60 so that is can be easily seen from a greater distance. This enables a caregiver to visually verify that exit detection system 44 is armed without having to approach closely to control panel 32 of patient support apparatus 20. In at least one embodiment, bed exit indicator 60*l* is large enough to be easily seen from a hospital hallway when patient support apparatus 20 is positioned inside a typical hospital room, thereby allowing a caregiver to visually verify the activation of exit detection system 44 from the hallway and to avoid having to enter the patient's room to obtain this verification.

FIG. 3C illustrates another manner in which controller 38 dynamically adjusts the visual appearance and functionality of control panel 32. The state of control panel 32 in FIG. 3C corresponds to the state of patient support apparatus 20 where an actuator limit has been reached. More specifically, control panel 32 of FIG. 3C corresponds to the state of patient support apparatus 20 where the height of seat 22 has been raised to its highest height (e.g. the actuator(s) 48 for changing the height of seat 22 has reached its (their) upper limit(s)). As a result, the height of seat 22 can no longer be raised any further and controller 38 has eliminated seat height control 34*h*, both visually and functionally from control panel 32. A user of patient support apparatus 20 therefore no longer sees control 34*h* and, if he or she were to press on the area of control 34*h*, no movement of seat 22 (or any other component of patient support apparatus 20) would occur. As soon as the height of seat 22 is lowered via control 34*i* (which remains functional), controller 38 reactivates and relights control 34*h*.

Although not shown, when the lowest height of seat 22 is reached, controller 38 alters control panel 32 in a similar manner by visually and functionally eliminating seat lowering control 34*i*. The visual appearance and functionality of seat lowering control 34*i* is restored as soon as a user raises the height of seat 22 via height raising control 34*h*.

FIG. 3D illustrates another manner in which controller 38 dynamically adjusts the visual appearance and functionality of control panel 32. The state of control panel 32 in FIG. 3D corresponds to the state of patient support apparatus 20 when the brake is not active. (As noted previously, the illumination of brake locked indicator 60*e*1 in FIG. 3D has been done merely for illustrative purposes. In actual practice, when the brake is off, only indicator 60*e*2 of FIG. 3D would be illuminated). As can be seen in FIG. 3D, controller 38 has eliminated the appearance and functionality of stand assist control 34*b*. As a result, patient support apparatus 20 cannot be moved into the stand assist configuration while the brake remains deactivated. The removal of this function (movement to the stand assist configuration) is done for safety purposes. Specifically, in helping a patient move into or out of patient support apparatus 20 from a standing position, it is important that patient support apparatus 20 not be able to move during the patient ingress or egress process. Accordingly, patient support apparatus 20 does not allow movement to this stand assist configuration unless the brake is activated, and this functional limitation is communicated to the user via the visual disappearance and functional deactivation of control 34*b* when the brake is not activated. The activation of the brake causes controller 38 to automatically restore the appearance and function of stand assist control 34*b*.

Figure 3E:
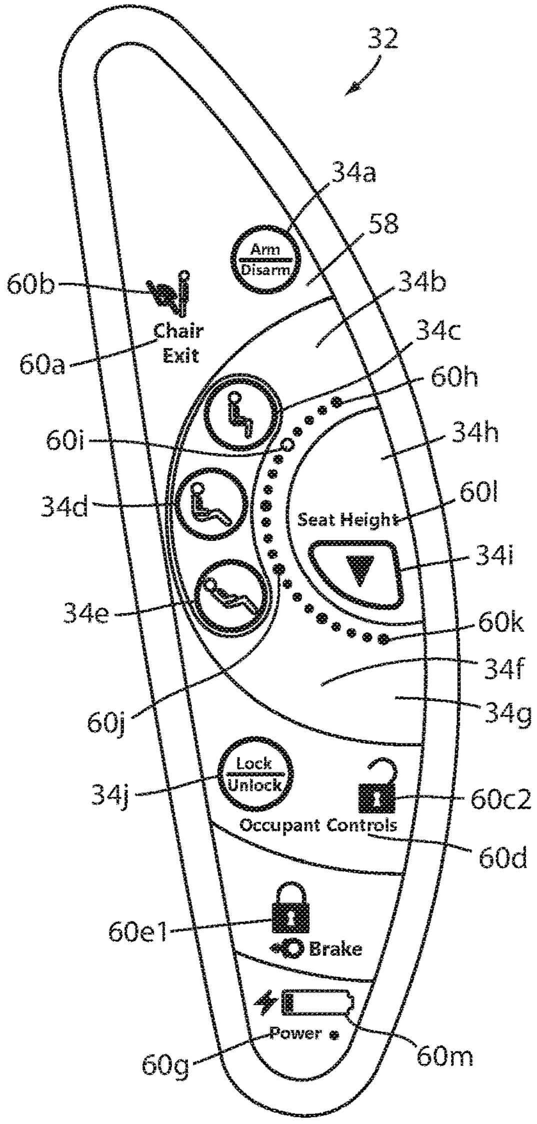
FIG. 3E is a plan view of the control panel of FIG. 3A shown in a state where the remaining charge on the battery has fallen below a threshold.

FIG. 3E illustrates another manner in which controller 38 dynamically adjusts the visual appearance and functionality of control panel 32. The state of control panel 32 in FIG. 3E corresponds to the state of patient support apparatus 20 when the battery has discharged to a level between an upper and lower threshold (the 1$^{st}$ and 2$^{nd}$ thresholds of Table 1). As can be seen in FIG. 3E, controller 38 has eliminated the appearance and functionality of the stand assist configuration control 34*b*, the flat configuration control 34*f*, the Trendelenburg configuration control 34*g*, and the seat height raising control 34*h*.

The elimination of the flat configuration control, the Trendelenburg configuration control, and the seat height raising control helps reduce the possibility of having the battery 54 completely discharge while the chair is in the flat or Trendelenburg configuration, or has its seat elevated. This is desirably avoided because the flat configuration, the Trendelenburg configuration, and a high seat height generally make it more difficult for a patient to exit from patient support apparatus 20. Thus, for example, if the battery were to completely discharge while a patient were in the Trendelenburg position (control 34*g*), it could be potentially difficult to comfortably transfer that patient out of patient support apparatus 20. Similar reasoning applies to the deactivation of seat height raising control 34*h*. That is, it is generally safer for a patient to exit patient support apparatus 20 while the height of seat 22 is at its lowest height, due to the possibility of the patient falling and being injured. Accordingly, by eliminating the functionality of the seat height raising control 34*h*, the possibility of the battery dying while the height of seat 22 is not at its lowest height is reduced. Controller 38 therefore eliminates certain movements of patient support apparatus 20 when the battery charge has drained below a threshold and controls the appearance and functionality of control panel 32 to match these eliminated movements. Controller 38 also removes the appearance and functionality of the stand assist control 34*b* from control panel 32 in order to avoid having the battery completely discharge in an intermediate configuration between the sitting and stand assist configurations, which could also be difficult for patient egress. The replacement of battery 54 with a fully charged battery or the connecting of the power cord of patient support apparatus 20 to an electrical wall outlet will cause controller 38 to restore the eliminated functionality of FIG. 3E.

Figure 3F:
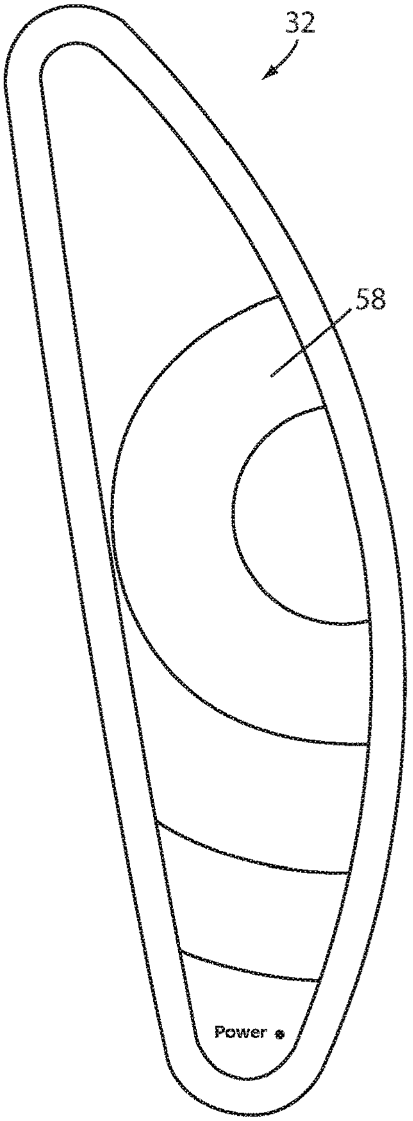
FIG. 3F is a plan view of the control panel of FIG. 3A shown in a sleep mode.

FIG. 3F illustrates another manner in which the visual appearance and functionality of control panel 32 is adjusted. Unlike with the adjustments made in FIGS. 3B-E, however, the adjustments made in FIG. 3F are not made by controller 38. Instead, the adjustments to control panel 32 that are illustrated in FIG. 3F are made by disabling electrical power to controller 38 and, in at least one embodiment, to most of the backlights 52. More specifically, FIG. 3F represents how control panel 32 looks when patient support apparatus 20 enters a sleep mode. The trigger for entering the sleep mode, in at least one embodiment, is the lack of a user touching any of control panels 32 and the lack of a patient touching any of the patient control panels for more than a threshold amount of time. In other words, the sleep mode is triggered when patient support apparatus 20 is inactive for longer than a threshold amount of time. In the sleep mode, electrical power is terminated to various electrical components in order to conserve electrical power. Sleep mode is exited by the user touching anywhere on control panel 32 (whether the touching point is aligned with a control 34 or not), or by a patient touching one of the controls on the patient control panel. Once the user touches control panel 32, controller 38 is supplied with power (woken up), and the functionality of control panel 32 is restored. Further details about one manner of entering and exiting the sleep mode are provided in commonly assigned U.S. patent application Ser. No. 62/160,155 filed May 12, 2015 by inventors Aaron Furman et al. and entitled BATTERY MANAGEMENT FOR PATIENT SUPPORT APPARATUSES, the complete disclosure of which is incorporated herein by reference.

Figure 3G:
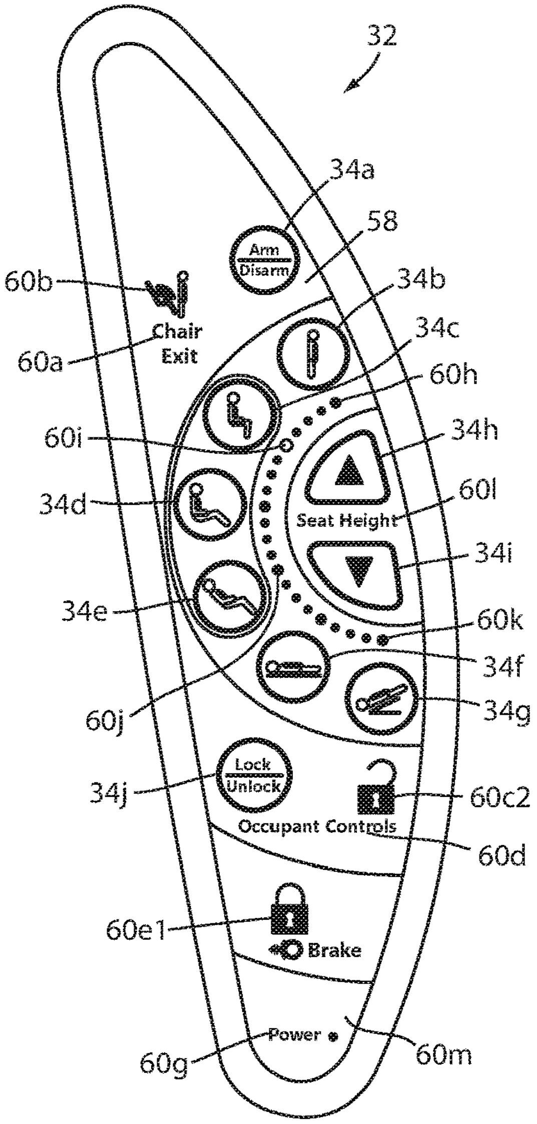
FIG. 3G is a plan view of the control panel of FIG. 3A shown when implemented on a patient support that is not equipped with a battery option.

FIG. 3G illustrates another manner in which controller 38 dynamically adjusts the visual appearance and functionality of control panel 32. The state of control panel 32 in FIG. 3G corresponds to the state of patient support apparatus 20 when patient support apparatus 20 is not equipped with a battery 54. That is, in some embodiments, patient support apparatuses 20 have at least two different configurations: a first one that is capable of operating on battery power and a second one that is not capable of operating on battery power. In order to avoid the need for building separate control panels for the two different versions of patient support apparatus 20, controller 38 is programmed to detect whether it is part of a battery-equipped patient support apparatus or not. When it is, controller 38 includes an indicator 60*m* on control panel 32 (which is visible in FIGS. 3A-3E) that provides an indication that patient support apparatus 20 is operating under battery power. Further, the indicator 60*m* may provide an indication of what the current charge level of the battery is. Indeed, in some embodiments, controller 38 may be configured to provide additional information regarding the state of battery 54, such as, but not limited to, an estimate of its remaining useful life, its overall health, the number of motion cycles the battery is able to do based on its current charge level, or other information. Manners of implementing these alternative displays of battery state information are discussed in the aforementioned 62/160,155 patent application and may be incorporated in various manners into control panel 32 of patient support apparatus 20 of FIG. 1. When patient support apparatus 20 is not constructed to operate on battery power, however, controller 38 does not display a battery indicator 60*m*, such as is shown in FIG. 3G.

Figure 3H:
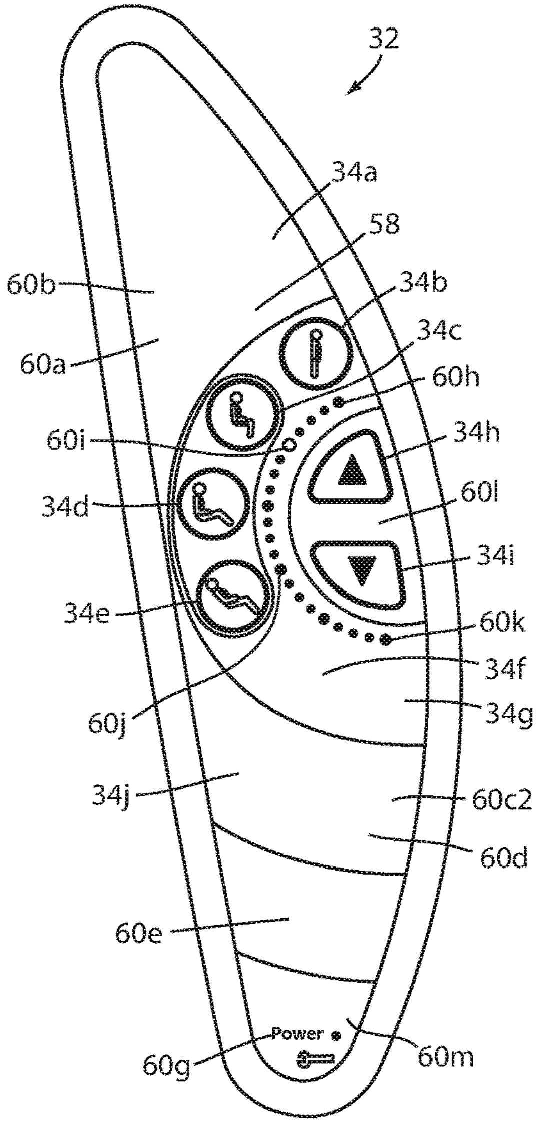
FIG. 3H is a plan view of the control panel of FIG. 3A shown in a maintenance mode.

FIG. 3H illustrates another manner in which controller 38 dynamically adjusts the visual appearance and functionality of control panel 32. The state of control panel 32 in FIG. 3H corresponds to a maintenance mode of patient support apparatus 20. The maintenance mode is designed for use by a technician who may be attempting to troubleshoot patient support apparatus 20. In one embodiment, patient support apparatus 20 is configured to allow the technician access to the maintenance mode when the technician touches a set of predefined controls 34 simultaneously and/or sequentially. Regardless of the specific manner in which the maintenance mode is entered, controller 38 changes the appearance and functionality of control panel 32 in the maintenance mode.

In the maintenance mode example shown in FIG. 3H, controller 38 has eliminated all of the controls 34 with the exception of controls 34*b*-*e* and 34*h*-*i*. Further, although not visually apparent in FIG. 3H, controller 38 has changed the functions that are associated with controls 34*b*-*e* and 34*h*-*i*. Instead of moving seat 22, backrest 24, and leg rest 30 to different configurations through the coordinated movement of simultaneously activated actuators, which is what controller 38 does for these controls in the normal mode, controller 38 moves individual actuators 48 in response to touching controls 34*b*-*e* when patient support apparatus 20 is in the maintenance mode. More specifically, in the maintenance mode, control 34*b* moves a backrest actuator, control 34*c* moves a foot rest actuator, control 34*d* moves a seat tilting actuator, and control 34*e* moves a seat lifting actuator. Further, the functions carried out by controls 34*h* and 34*i* are changed so that, instead of raising the height of seat 22, controls 34*h* and 34*i* control which direction the individual actuators are moved when in the maintenance mode.

Thus, for example, if a technician wants to move the backrest actuator upward, he or she presses on controls 34*b* and 34*h* simultaneously while in the maintenance mode. If the technician wants to move the backrest actuator downward, he or she presses on controls 34*b* and 34*i* simultaneously. If he or she wants to move the leg rest actuator upward, he or she presses on controls 34*c* and 34*h* simultaneously. Similar combinations allow the technician to move each of the four actuators individually in whichever direction the technician wishes. This allows the technician to individually test each actuator's movement and better pinpoint the source of a motion problem that patient support apparatus 20 might be experiencing. The maintenance mode is exited, in at least one embodiment, in a similar manner to how it is entered, such as by touching a set of predefined controls 34 simultaneously and/or sequentially.

As can be seen in FIG. 3H, controller 38 also displays a maintenance mode indicator 60*n* when patient support apparatus 20 has entered the maintenance mode. This provides the user, such as the technician, with a visual indication that patient support apparatus 20 is in the maintenance mode, and that the functions associated with controls 34*b*-*e* and 34*h*-*i* are not the same as the functions the controls are associated with when patient support apparatus 20 is in the normal mode.

Although not illustrated in any of the drawings, patient support apparatus 20 is also configured, in at least one embodiment, to enter into a diagnostic mode when a user touches a set of predefined controls 34 simultaneously and/or sequentially. The set of controls and/or sequence used to enter the diagnostic mode is different from the set of controls and/or sequence used to enter the maintenance mode. When in the diagnostic mode, controls 34 and/or indicators 60 may be changed by controller 38 to carry out different functions and/or to indicate different information. For example, in one embodiment, when patient support apparatus 20 is in the diagnostic mode, the curved line of circular indicators (that includes indicators 60*h*-*k*) is used to indicate different diagnostic codes, rather than the current configuration state of seat 22, backrest 24, and leg rest 30. Controller 38 communicates these diagnostic codes by illuminating selected ones, or selected groups, of the circular indicators.

In some embodiments, the illumination of the selected ones, or groups, of the circular indicators 60 is carried out by illuminating certain ones of the circular indicators at a higher level of illumination than the other circular indicators. In this manner, the user is able to more easily see the relative position of the more brightly illuminated circular indicators with respect to the more dimly illuminated circular indicators. In order for a user to view different diagnostic codes, one or more of the controls 34 may be used to scroll through, or otherwise select from, the set of all available diagnostic codes that patient support apparatus 20 is capable of providing. Exiting from the diagnostic mode may be carried out in a manner similar to that used to enter the diagnostic mode (e.g. such as by touching a set of predefined controls 34 simultaneously and/or sequentially). In other embodiments, exiting from either of both of the diagnostic and maintenance modes may be carried out automatically by controller 38 after a predefined time period passes without any touches being sensed on control panel 32 by sensors 50.

Controller 38 is also configured, in at least one embodiment, to change the appearance of control panel 32 based upon the intended country or locale in which patient support apparatus 20 is to be sold and/or used. That is, controller 38 is configured, in at least one embodiment, to eliminate all English word indicators 60 when patient support apparatus 20 is to be sold or used in a predominantly non-English speaking country or locale. In other words, controller 38 never powers the backlights for the English word indicators 60. In contrast, when patient support apparatus is sold or used in an English speaking country or locale, controller 38 utilizes the English word indicators 60 as appropriate. In at least one such embodiment, when controller 38 eliminates the backlighting for the English word indicators 60, it provides backlighting for alternative indicators 60 (not shown in the drawings) that include either non-word indicators or word indicators that are written in the predominant language of the country or locale in which patient support apparatus 20 is to be used or sold. By programming controller 38 to behave in different manners depending upon the intended geographic location of use of patient support apparatus 20, it is possible to manufacture a single control panel 32 for patient support apparatuses 20 that are intended for the different locations, rather than incorporating different types of control panels into patient support apparatus 20, depending upon the geographic location it is intended to be sold or used in.

Although the foregoing description of control panel 32 has been provided herein with primary reference to a patient support apparatus 20 implemented as recliner, it will be understood that the principles of dynamically adjusting the visual look and functionality of a control panel based upon the configuration and/or power state of the patient support apparatus can be applied to other types of patient support apparatuses, such as beds, stretchers, cots, and the like, as well as patient treatment devices, such as patient temperature management systems. It will also be understood that, although the majority of the description provided herein of dynamically adjusting the visual look of control panel 32 has focused on visually eliminating and restoring certain controls 34 and/or indications 60, other embodiments of patient support apparatus 20 can dynamically alter the visual appearance of control panel 32 in different ways. For example, instead of visually eliminating and restoring controls 34 and indicators 60, controller 38 can be configured in some embodiments to change the color of the backlighting that is provided to the controls 34 and/or indicators 60 when their functionality is eliminated or changed. Still further, in some embodiments, controller 38 is configured to dim, but not completely eliminate, the amount of illumination provided to controls 34 and/or indicators 60 when their associated functions are eliminated or changed. Still other types of visual changes to control panel 32 are possible in response to changes in the power state, configuration state, or other states of patient support apparatus 20.

Various additional alterations and changes beyond those already mentioned herein can be made to the above-described embodiments. This disclosure is presented for illustrative purposes and should not be interpreted as an exhaustive description of all embodiments or to limit the scope of the claims to the specific elements illustrated or described in connection with these embodiments. For example, and without limitation, any individual element(s) of the described embodiments may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Any reference to claim elements in the singular, for example, using the articles “a,” “an,” “the” or “said,” is not to be construed as limiting the element to the singular.

What is claimed is:

1. A patient support apparatus comprising:
- a frame;
- a plurality of wheels;
- a support surface supported by the frame and adapted to support a patient thereon;
- an actuator assembly for moving the support surface to a plurality of different configurations, the actuator assembly including a plurality of actuators;
- a control panel including a first icon and a second icon; and
- a control system adapted to switch the patient support apparatus from a first mode to a second mode, wherein the first icon is associated with a first function of the patient support apparatus and the second icon is associated with a second function of the patient support apparatus when the patient support apparatus is in the first mode, and wherein the first icon is associated with a third function of the patient support apparatus and the second icon is associated with a fourth function of the patient support apparatus when the patient support apparatus is in the second mode.

2. The patient support apparatus of claim 1 further comprising
- a first control on the control panel for controlling the first function of the patient support apparatus and a second control on the control panel for controlling the second function of the patient support apparatus
  - a first backlight for backlighting the first control and a second backlight for backlighting the second control; and
  - wherein the control system is adapted to disable the first control when a component of the patient support apparatus is in a first state and to change an illumination state of the first backlight when the component is in the first state, the control system further adapted to enable the second control and not change an illumination state of the second backlight when the component is in the first state.

3. The patient support apparatus of claim 2 wherein the component is a brake changeable between a braked state and an unbraked state, and wherein the first state corresponds to the unbraked state.

4. The patient support apparatus of claim 3 wherein the first control moves the support surface to a stand-assist configuration in which the support surface is oriented to support the patient while the patient is nearly standing.

5. The patient support apparatus of claim 3 wherein the patient support apparatus is a recliner having a seat, a backrest, and a leg rest.

6. The patient support apparatus of claim 5 further including an exit detection system that, when armed, is adapted to detect when the patient has exited the support surface.

7. The patient support apparatus of claim 6 wherein the control system is further adapted to disable the first control when the exit detection system is armed.

8. The patient support apparatus of claim 7 wherein the first control moves the support surface to a stand-assist configuration in which the support surface is oriented to support the patient while the patient is nearly standing.

9. The patient support apparatus of claim 1 wherein the first function activates the plurality of actuators to move the support surface to a first configuration and the second function activates the plurality of actuators to move the support surface to a second configuration.

10. The patient support apparatus of claim 9 wherein the third function activates a first individual one of the plurality of actuators only, and the fourth function activates a second individual one of the plurality of actuators only.

11. The patient support apparatus of claim 1 wherein the first function indicates one of the different configurations of the support surface and the third function indicates diagnostic information regarding the patient support apparatus.

12. The patient support apparatus of claim 1 wherein the first function indicates one of the different configurations of the support surface and the third function indicates a code.

13. The patient support apparatus of claim 12 wherein the first icon includes a plurality of markers that are selectively illuminated to indicate a current configuration of the support surface and that are selectively illuminated to indicate the code.

14. The patient support apparatus of claim 1 wherein the control panel further includes a third icon and a backlight for backlighting the third icon, wherein the control system is further adapted to activate the backlight when the patient support apparatus is in the first mode and to deactivate the backlight when the patient support apparatus is in the second mode.

* * * * *